Figure 1:
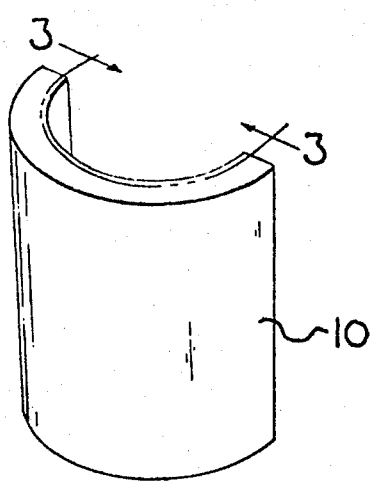

United States Patent [19]

Shannon

[11] 3,753,751

[45] Aug. 21, 1973

[54] LIGHT WEIGHT BODIES OF COTTON FIBER REINFORCED HYDROUS ALKALINE EARTH METAL SILICATE THERMAL INSULATION MATERIAL

[75] Inventor: Richard F. Shannon, Lancaster, Ohio

[73] Assignee: Owens-Corning Fiberglas Corporation, Toledo, Ohio

[22] Filed: Mar. 12, 1970

[21] Appl. No.: 26,466

Related U.S. Application Data

[62] Division of Ser. No. 639,070, May 17, 1967, Pat. No. 3,562,084.

[52] U.S. Cl. ................................................ 106/120
[51] Int. Cl. ............................................ C04b 15/06
[58] Field of Search ............................. 106/119, 120

[56] References Cited
UNITED STATES PATENTS 2,698,251  12/1954  Shea et al. ........................ 106/120
2,698,256  12/1954  Shea et al. ........................ 106/120

Primary Examiner—James E. Poer
Attorney—Staelin & Overman and Daniel D. Mast

[57] ABSTRACT

A synthetically prepared body of molded high temperature thermal insulation material composed essentially of a matrix of chemically combined alkaline earth metal silicate interspersed with cotton fibers tenaciously anchored into the matrix and providing reinforcement and increased structural strength and integrity to the insulation material. The cotton fibers are interspersed in the matrix of the insulation material in the form of individual or wound groupings of filaments, strands or rovings or the like and/or in the form of an open network fabric of interlocked or interwoven cotton fibers such as cotton mesh or cotton netting or the like.

15 Claims, 4 Drawing Figures

PATENTED AUG 21 1973 3,753,751

LIGHT WEIGHT BODIES OF COTTON FIBER REINFORCED HYDROUS ALKALINE EARTH METAL SILICATE THERMAL INSULATION MATERIAL

This is a division of copending application Ser. No. 639,070 filed May 17, 1971, now U.S. Pat. No. 3,562,084.

Customarily, alkaline earth metal silicate insulation materials of the type with which the present invention is primarily concerned are synthetically manufactured by processing steps and techniques which involve an initial preparation of an aqueous slurry, or dispersion, of reactive proportions of finely-divided alkaline earth metal and siliceous constituents which are homogeneously intermixed together with one or more fibrous constituents. Subsequently processing steps customarily include subjection of the aqueous slurry to the influence of elevated temperatures, usually accompanied by elevated pressures, capable of inducing or initiating gelation and subsequent crystallization of the finely-divided reactive constituents. The gelation and crystallization progresses in a manner which may be generally likened unto a polymerization type of reaction in that the alkaline earth metal constituents, the siliceous constituents and the aqueous constituent progressively combine and convert the slurry admixture into a porous or microporous shape sustaining mass of integrated and chemically combined crystalline material interspersed and reinforced with fibrous constituents.

As in the process disclosed in U.S. Pat. No. 2,699,097, the hydrothermally induced or supported gelation and crystallization of the slurry constituents may be interrupted as soon as the slurry has obtained a sufficiently thickened consistency. Following such a process as that last-mentioned, it is then customary practice to pressure shape the gelled mass in a filter mold and thereafter continue the hydrothermal reaction by the further use of elevated temperatures. Alternatively, as in the processes disclosed in U.S. Pat. Nos. 2,432,981 and 2,547,127, the initially prepared slurry may be placed into a cavity-type mold and directly molded therein, without interruption, to its final shape and configuration.

In each of the above types of processes, as well as in several well-known variations thereof, hydrothermal or pneumatolytic processing is essential to the conversion of the slurry constituents to a chemically combined crystalline product.

The porous integrated crystalline or microcrystalline structure of alkaline earth metal silicate thermal insulation materials gives rise to many desirable physical characteristics which, as is well-known to those skilled in the art, are not attainable with other types of thermal insulation materials. As an example, hydrothermally processed alkaline earth metal silicate insulation materials characteristically possess integrated crystalline or microcrystalline sructures which, unlike most other thermal insulation materials, are ordinarily capable of effective use as molded bodies of light weight, low K-factor, thermal insulation at temperatures ranging upwards of F. to, and in some instances above, 1,800° F., depending in large part upon the particular alkaline earth metal silicate formulation or composition employed and also upon the porosity and apparent density of the body of insulation material. As a consequence of the highly desirable thermal insulating characteristics and ease of manual installation, thermal insulation materials of the alkaline earth metal silicate variety have been extensively utilized in pre-shaped or molded form as exterior surface insulation for steam pipes, boilers, autoclaves, and reaction kettles and the like. Such molded thermal insulation materials, of course, also have wide spread structural applications as surface insulation for numerous other types of installations in which a low K-factor thermal insulation is necessitated or desired. Some of the numerous other structural applications are those in which the insulation is employed in conjunction with heated ducts, furnaces, machinery and building members. Moreover, although insulation materials of the alkaline metal earth silicate variety are most frequently employed for the purposes of providing high temperature thermal insulation, it is also well-known that alkaline earth metal silicate thermal insulation materials are likewise effective to provide an extremely low K-factor when employed in conjunction with installations wherein extremely low temperature situations are necessitated or desired.

Recognizing that many of the most important uses of molded bodies of hydrothermally prepared alkaline earth metal silicate thermal insulation materials are uses such as those mentioned above, structural strength is, of course, an extremely important factor to be considered in the selection of the particular thermal insulation materials to be used. Moreover, it is important that such means as may be employed to impart increased structural strength to the thermal insulation material should not be such as to adversely affect the heat insulating characteristics of the material or interfere with the ease of installation thereof. As is well-known in the art, it has been customary to include spiculated fibrous constituents in the initial slurry which add bulk to the slurry to impede settling and which also provide reinforcement to the final molded product. Of course, the fibers must be such as to be capable of withstanding the various processing steps and chemical interactions so as to retain a fibrous form in the ultimate product. The importance of the inclusion of fibrous constituents within the insulation material is extremely important. Although in many instances the fluid nature of the aqueous slurry necessitates the inclusion within the slurry of fibrous constituents of the type which are capable of being introduced into the slurry in a highly spiculated or flocculent condition in order to add bulk and to enhance the thickening and suspension characteristics of the slurry, the inclusion of fibrous constituents within the slurry also serves to provide internal reinforcement to the resultant body of molded insulation material. Such reinforcement is particularly desirable from the standpoint of enhancing the tensile strength and hinging strength of the molded material and consequently rendering the molded insulation material less susceptible to damage or breakage either during processing, storage, shipment, handling and installation.

The types of fibers which have heretofore been found to be most advantageous and beneficial in the attainment of the desired bulking and strength properties discussed above may be classified as inorganic mineral fibers. For example, it has been customary to utilize various mineral forms of asbestos fibers, such as fibers of chrysotile or fibers of amosite or mixtures of both types of fibers, incorporated in alkaline earth metal silicate slurries. Other inorganic fibers that have been known to have been at least suggested for such use are glass fibers and other various miscellaneous forms of mineral fibers such as fibers of crocidolite, anthophylite, actinolite and tremolite.

A common attribute of all of the foregoing types of inorganic fibers is that they are all relatively expensive, especially in comparison with the cost of the other constituents customarily making up the balance of the alkaline earth metal silicate insulation material. Moreover, it is ordinarily quite difficult or inordinately expensive to obtain such types of mineral fibers in a mineral or physical form capable of imparting the desirable degree of bulking or flocking capacity in lengths sufficient to provide the degree of reinforcing strength desired. Moreover, most of the inorganic mineral fibers tend to possess a relatively brittle fiber structure which permits the fibers to be too susceptible to breaking while being filamentized and fiberized or while being intermixed with the slurry constituents.

Although from a cost standpoint the use of naturally occurring organic fibers is desirable, their use has been regularly avoided in insulation materials produced by hydrothermal processing techniques upon the commonly accepted belief that all such organic fibers undergo excessive shrinkage, strength loss and overall physical degradation when exposed to the elevated temperatures and pressures employed in hydrothermal or pneumatolytic processing techniques and methods regularly employed in conjunction with the formation of shaped or molded bodies of synthetic alkaline earth metal silicate thermal insulation materials. Moreover, it has also been found that many of the naturally occurring fibrous forms of organic materials tend to exude or otherwise dispel jucies or fluids; the presence of which, even in small amounts, frequently produce adverse effects and appreciably interferes with the reactivity and conversion of the slurry constituents into the desired integrated body of crystalline or microcrystalline material. In this latter respect, it is suspected that the heat and/or pressure accompanying hydrothermal or pneumatolytic processing techniques cause the organic fibers to release substances such as polysaccharides, hemicellulose, lignocellulose, tannin, gums and resins, as well as pectins and pentosans, which, when liberated into the slurry, tend to interfere with the chemical activity or reactivity of one or more of the slurry reactants or crystal phases. Hence, although organic materials such as wood fibers, straw, excelsior, bagasse and similar naturally occurring organic fibrous materials find occasional use as bulking and reinforcing fibers in nonhydrothermally processed insulation materials, such use is, by contrast, clearly avoided in hydrothermal processes. Instead, of necessity, substantially more expensive inorganic mineral fibers have been utilized even though such fibers usually do not compare favorably with many less costly organic fibers either as to cost or availability or as to bulking or suspension characteristics.

By virtue of the foregoing problems and difficulties, substantial effort has been devoted towards the discovery of a low cost, easily obtainable fiber having the requisite physical and chemical characteristics which would render it suitable for use as an internal reinforcing fiber in hydrothermally or pneumatolytically synthesized hydroalkaline earth metal silicate insulation materials. As a consequence of such efforts and experimentation, a fiber possessing the desired characteristics has been found. Quite unexpectedly and quite unlike other naturally occurring organic fibers, it has been found that cotton fibers not only possess the desired characteristics, but also provide other additional highly desirable characteristics to molded hydrous alkaline earth metal silicate insulation materials. Unlike that which would be expected of a naturally occurring organic fiber, it was discovered that the various hydrothermal or pneumatolytic processing steps commonly employed as a means of synthetically producing molded bodies of hydrous alkaline earth metal silicate insulation material did not cause the cotton fibers to undergo appreciable degradation nor cause the cotton fibers to emit any substances which noticeably interfered with the chemical reactivity or crystallization of the slurry constituents. Quite to the contrary, it was discovered that the hydrothermal or pneumatolytic processing imparted significantly improved reinforcing properties to the cotton fibers. As a consequence, the strength of the resultant body of molded insulation material is increased to a much greater extent than is ordinarily obtained by an equivalent amount of commonly used types of expensive asbestos fibers. Moreover, the cotton fibers, by possessing a low coefficient of thermal conductivity (K-factor), aid in the insulating properties of the resultant insulation material. Additionally, the utilization of cotton fibers in place of a portion or all of the more commonly employed mineral fibers improves the cutability or sawability of the insulation material. And, most importantly, the cotton fibers alleviate, or obviate, the common tendency of fibrous mineral constituents, such as asbestos fibers, to scratch or irritate the skin and respiratory system of persons cutting, installing, handling or coming into contact with the insulation material.

In addition to the discovery concerning the use of individual cotton fibers as internal reinforcement of hydrothermally or pneumatolytically processed bodies of hydrous alkaline earth metal silicate insulation material, it was also discovered that further advantageous and beneficial results may be obtained, in many instances, by utilizing the cotton fibers in the form of an open-work fabric such as a cotton mesh fabric or cotton netting, or the like. In such form, the interlocked nature and character of the interwoven or interwound fiber network provide additional internal reinforcing strength to the resultant body of insulation material. Of course, it should be evident that, according to particular needs or desires, beneficial and advantageous results are also obtainable utilizing a combination of both randomly disposed cotton fibers and cotton open network fabric within the same body of insulation material.

Keeping the foregoing in mind, it is a principal objective of the present invention to provide an alkaline earth metal silicate thermal insulation material internally interspersed with readily obtainable low cost fibers which are capable of withstanding hydrothermal or pneumatolytic processing of the insulation material and thereafter imparting increased strength to the resultant product.

Another salient objective of the present invention is to provide fibers of the type characterized in the foregoing objective and which are interlocked or interwoven together to form an open network or grid of fibers extending in interconnected network array through the matrix of the thermal insulation material.

Another important objective of the present invention is to provide a molded body of alkaline earth metal silicate insulation material which possesses a relatively high hinging strength such that the insulation material will resist breaking apart into separate segments after the insulation material may have been fractured, broken or otherwise damaged.

Figure 3:
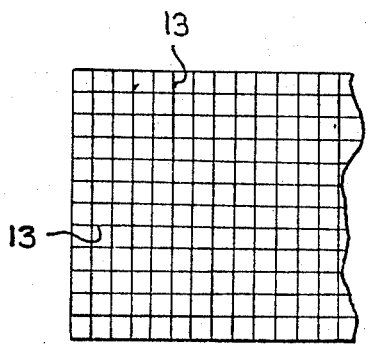
Figure 2:
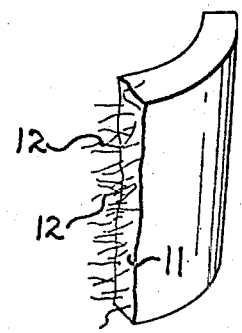
Figure 4:
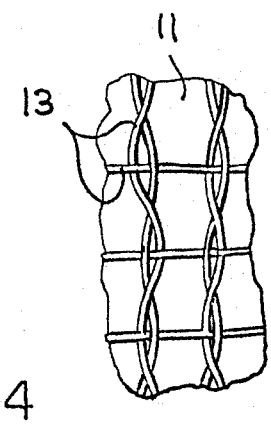

The specific nature of this invention, as well as other objects and advantages thereof, will become readily apparent to those skilled in the art from the ensuing detailed disclosure taken in conjunction with the annexed sheet of drawings, on which, by way of example only, certain preferred embodiments of the present invention are represented, and whereon:

FIG. 1 is a perspective view of a molded body of synthetically prepared hydrous alkaline earth metal silicate insulation material which, solely for purposes of illustration, is shown being shaped to correspond to one of the conventional forms of usage thereof; and FIG. 2 is an enlarged perspective view of a broken segment of the insulation material shown in FIG. 1 and schematically depicting the reinforcing fibers embedded in the matrix of the insulation material according to one preferred form of the invention; and FIG. 3 is a fragmentary sectional view showing another form of the invention embodied in a molded body of insulation material like that shown in FIG. 1 and viewed in a direction generally corresponding to the direction of the sectional plane 3—3 in FIG. 1; and FIG. 4 is an enlarged fragmentary view of a portion of the insulation material, as shown in FIG. 3, to more clearly show the character of the reinforcing fibers.

Before proceeding with a detailed description of the drawings, it is important to keep in mind that the nature and character of the present invention, as well as the structural and physical features thereof, are such that the inventive concepts are not restricted to particular shapes of molded insulation material. Rather, the invention is such that it applies without limitation to all forms, shapes and customary usages of hydrothermally or pneumatolytically molded bodies of hydrous alkaline earth metal silicate insulation materials. Keeping the foregoing in mind, there is generally represented in each of FIGS. 1, 2 and 3 a molded, light-weight body of alkaline earth metal silicate insulation material in which the concepts of the present invention are embodied and which has been synthetically prepared by hydrothermal or pneumatolytic processing steps and techniques which will be subsequently described in greater detail.

More particularly, it will be observed in FIG. 1 that the insulation material 10 is depicted as being of an elongated, semi-tubular shape which is of the type customarily employed for use in covering and insulating piping or conduit. The shape and configuration illustrated is, however, merely one of many shapes, sizes and configurations for molded insulation materials and is merely representative of any of various suitable molded shapes and configurations benefited by the present invention. The insulation material comprises a porous or microporous matrix 11 of crystalline or microcrystalline hydroalkaline earth metal silicate material throughout which, as best observed in FIG. 2, numerous reinforcing fibers 12 are individually distributed in randomly disposed array.

Although other types of reinforcing fibers may be present in the matrix 11 in substantial quantities, the reinforcing fibers shown, in accordance with the concepts of this invention, are composed of cotton fibers which are securely and tenaciously anchored in the matrix 11 of the insulation material. Without departing from the concepts or intendment of the invention, the use of the term "cotton fibers" is meant to include individual filaments, wound groupings of filaments, strands, roving, or various combinations thereof. Furthermore, the reinforcing fibers may be in the matrix of the insulation material in the form of a continuous grid or open network of interwoven and interlocked fibers. Otherwise stated, the cotton fibers may also be present in the form of a continuous open-mesh cotton fabric 13, such as in the form of any one of various types of cotton netting or cotton mesh material. Moreover, although not illustrated, it is to be understood that the features of both FIG. 2 and FIG. 3 may be combined together in such manner that the molded insulation material may include a combination of individual randomly disposed cotton fibers together with a cotton mesh fabric and, if desired, together with other conventional fibers.

The production or manufacture of molded hydrous alkaline earth metal silicate insulation materials of the nature and character hereinbefore described may be carried out in accordance with most any of several well-known prior art methods and procedures. Moreover, as will become readily apparent from the following description of some of the more prevalent commercial methods and processes of manufacturing molded hydrous alkaline earth metal silicate insulation materials, the present invention is readily compatible with such manufacturing processes and techniques.

One commonly known method heretofore utilized extensively in the commercial production of molded hydrous alkaline earth metal silicate insulation material involves the use of finely comminuted and reactive proportions of alkaline earth metal and siliceous constituents which are thoroughly admixed with a preponderant amount of water to form an aqueous slurry of suspension. Substantial amounts of segregated fibrous materials are customarily admixed with the slurry constituents in order to promote the suspension characteristics of the slurry and also to materially aid in the internal coherence and strength of the final product. The slurry is then customarily poured or placed in a cavity-type mold or pan-casting mold shaped to provide molding surfaces definitive of the configurational and dimensional characteristics desired for the ultimate body of insulation material. The mold-contained slurry is thereafter subjected to hydrothermal or pneumatolytic processing conditions employing elevated temperatures and pressures which, due to convenience and considerations of economy, are commonly supplied by the use of superatmospheric steam accompanied by sufficient pressure to prevent ebullition of the slurry. Such processing tends to effect a polymerization type of gelation and subsequent crystallization of the aqueous, calcareous and siliceous constituents and progressively produces an in-situ conversion or transformation of the slurry into an indurated body of hydrous alkaline earth metal silicate insulation material characterized by an integrated, microporous, crystalline matrix interspersed with randomly disposed fibers. Excess residual quantities of the aqueous medium, which after conversion may remain in an uncombined or free state in the resultant body of crystalline material, may be removed by conventional drying or evaporation techniques.

Another common hydrothermal or pneumatolytic method of synthetically producing molded bodies of light-weight alkaline earth metal silicate insulation material involves the employment of filter-press techniques. Briefly, a slurry is prepared which may follow the same manner of slurry preparation as previously described. However, by way of contrast with the previously described "pan casting" method, the subsequent processing of the slurry involves placing the slurry in a filter-press mold or compression-mold by means of which substantial proportions of the aqueous medium are removed from the slurry under pressure filtration. The pressures used may be as high as several hundred pounds per square inch, depending upon the nature of the ensuing procedures. In certain instances, extremely high pressures are desirable to mold the slurry constituents to the desired shape and dimensions and to impart sufficient self-supporting strength to permit almost immediate removal and transfer of the partially dewatered slurry directly to a drying chamber, where it is dried to its final state. Alternatively, the residual dewatered slurry material may be removed from the filter-press or mold and transferred to a high temperature-pressure chamber, such as a superatmospheric steam autoclave, where the compressed slurry constituents are indurated, under the influence of elevated temperatures and pressures, and thereafter dried.

Irrespective of which of the foregoing types of hydrothermal or pneumatolytic processes is employed, cotton fibers may be used as a portion or all of the fibers in the slurry to produce a product possessing enhanced structural properties not achieved with other types of commonly used fibers. Based upon examination of the resultant product, it appears that during the course of the hydrothermal or pneumatolytic processing the cotton fibers become stronger and distend, enlarge or expand and become tenaciously anchored in and cleave to the surrounding matrix of the resultant microcrystalline alkaline earth metal silicate material. Although the reason for this phenomena is not fully understood, and it is not intended that an explanation thereof should be of limiting scope, it is suspected that this phenomena may be attributable in part to a mercerization of the cotton fibers.

In addition to being suitable for use in conjunction with any of many common or commercially employed procedures involving hydrothermal or pneumatolytic processing of a slurry for the preparation of various types of molded hydrous alkaline earth metal silicate insulation materials, the present invention is equally suitable for the preparation of all types of molded, light-weight, hydrous alkaline earth metal silicate insulation materials including high temperature hydrous calcium silicate insulation materials which are capable of withstanding exposure to higher temperatures than most of the other types of hydrous alkaline earth metal silicate insulation materials. Such hydrous alkaline earth metal silicate insulation materials may be prepared in accordance with the methods and procedures set forth in U.S. Pat. Nos. 2,665,996 and 2,547,127, both issued to George L. Kalousek, and by mesne assignment assigned to the assignee of the present invention. In accordance with such methods and procedures, finely divided reactive proportions of lime and silica are uniformly dispersed in water to solids weight ratio in the range of about 3:1 to 9:1. To the slurry there is also added and dispersed a suitable quantity of flocculent fibrous material. The fibrous slurry is then introduced into a pan-type or cavity-type mold and indurated under the influence of elevated temperatures and pressures in an autoclave, or the like. Thereafter, the molded insulation material is ordinarily removed from the autoclave and may be dried by suitable drying apparatus to remove residual uncombined or free water, if any, which may still remain in the body of insulation material.

The specific lime to silica ratio of the slurry, of course, is dependent primarily upon the desired type of crystalline hydrous silicate desired in the final product. For example, if it is desired to obtain a drystalline product predominantly composed of a crystalline matrix structure of the type commonly referred to as synthetic xonotlite ($5CaO \cdot 5SiO_2 \cdot H_2O$), a $CaO/SiO_2$ mol ratio of approximately 1:1 is utilized in the slurry On the other hand, if it is desired to obtain a crystalline structure predominantly composed of a crystalline matrix structure of the type commonly referred to as synthetic tobermorite ($4CaO \cdot 5SiO_2 \cdot 5H_2O$), a $CaO/SiO_2$ mol ratio of approximately 0.8:1 would be utilized in the slurry. Control of the density of the resultant product is primarily accomplished by controlling the relative amount of water utilized in the make-up of the slurry. For example, an apparent density of 11 pounds per cubic foot, which may be considered a nominal apparent density, would be obtained utilizing a slurry having a ratio of water to total dry solids of approximately 6:1.

In accordance with such procedures, and as a demonstrative basis for measurable comparison of the advantages of the present invention, a conventional representative light-weight body of molded hydrous alkaline earth metal silicate insulation material predominantly composed of a microporous matrix of crystalline tobermorite was synthetically prepared from a slurry composed of water and raw batch constituents of the kind and amount tabulated in Example 1 following.

EXAMPLE 1

| Raw Batch Constituent | Percent of Solids (dry weight basis) |
|---|---|
| Amosite asbestos (W3 grade) | 12.6 |
| Chrysotile asbestos (6D grade) | 3.2 |
| Quicklime (CaO = 94%) | 27.8 |
| Tripoli ($SiO_2$ = 99%) | 12.6 |
| Diatomaceous earth ($SiO_2$ = 83%) | 21.2 |
| Clay ($SiO_2$ = 45%) | 3.2 |
| Finely ground inorganic filler | 19.4 |
|  | 100.0 |

The quicklime, tripoli, diatomaceous earth, clay and filler constituents of Example 1, all in finely comminuted form, were thoroughly admixed together with water (60° F.) to form a substantially uniform slurry admixture having a water to dry solids ratio of 6.13:1. The resultant slurry was then poured into a mold suitable for forming a body of insulation material having a shape such as that depicted in FIG. 1. A conventional mold suitable for such purposes is shown and described in U.S. Pat. No. 2,716,070. Thereafter, while retained in a quiescent state within the mold, the slurry was indurated into a hardened self-supporting crystalline body of porous, light-weight material. The induration was carried out in conventional manner by subjecting the mold-contained slurry to a temperature of 550° C. and a pressure of 250 p.s.i.g. for approximately 1 hour in a steam autoclave. The indurated crystalline product was then dried to constant weight and possessed an apparent density of approximately 11 pounds per cubic foot.

The filler material employed in Example 1 was composed of a finely ground admixture composed of suitable filler materials such as those described in U.S. Pat. No. 3,001,882. Such filler materials have no significant bearing upon the present invention or the practice thereof and are included merely for the primary independent purposes of economy and of improving the insulating characteristics (K-factor) of the resultant insulation material.

For relative evaluation of the increased strength and other advantages achievable following the concepts of the present invention, several slurries were prepared utilizing the raw batch formulation and processing steps described above with respect to Example 1. However, to each of the several slurries, different forms of cotton fibers were added and thoroughly admixed prior to induration. For example, cotton fibers in the form of relatively inexpensive types of various commercially available kinds of cotton string cut to an overall average length of 1-½ inches were introduced into each of the slurries. Several various types of such cotton string, twine and the like are identified and designated by Example Numbers 2-9 in Table A below.

TABLE A

| Ex. No. | Identity of cotton fiber, string, twine, etc. | Source of supply | Wt. of fiber, string, twine, etc. (gms/100 ft.) |
|---|---|---|---|
| 2 | 12/4 Bag Sewing-Mimosa | I | 6.91 |
| 5 | Clarks "Boar" 4/cord TKT 10 | II | 7.68 |
| 3 | 10/4 Bag Sewing-Mimosa | I | 8.40 |
| 4 | 12/5 Bag Sewing-Mimosa | I | 8.84 |
| 6 | Lawndale No. 5 Polished Twine | III | 8.91 |
| 7 | Lawndale Variegated | III | 10.05 |
| 8 | Linen Thread Co. Barbour Celect Cotton | IV | 27.68 |
| 9 | Shelton Cotton Twine 12 ply | V | 29.17 |

Identity of Source of Supply:
I. Cleveland Co., Lawndale, North Carolina
II. Coats & Clark's Sales Corp., New York, New York
III. Cleveland Mills Co., Lawndale, North Carolina
IV. Linen Thread Co., Inc., Subsidiary of Indian Head Mills, Inc., Blue Mountain, Alabama
V. Shelton Hosiery Mills, Shelton, Connecticut The cotton fibers in each of the Examples in Table A constituted an addition of approximately 1-½ percent by weight (dry weight basis) of the weight of the raw batch materials in Example 1. The resultant molded bodies of insulation material all being of identical molded size, shape and configuration were then tested under the same testing conditions, for tilt drop strength, by causing each test specimen to gravitate through an arc of 90°, e.g., from a standing vertical position to a horizontal position, against a stationary platform. The relative tilt drop strength of each body of molded insulation material is correlated in Table B below; using a relative strength factor of 1.0 for the conventional product of Example 1 in which no cotton fibers were present in the material.

TABLE B

| Example Number | Relative Tilt Drop Strength |
|---|---|
| 1 | 1.0 |
| 2 | 3.3 |
| 3 | 4.2 |
| 4 | 3.1 |
| 5 | 4.2 |
| 6 | 4.2 |
| 7 | 2.9 |
| 8 | 3.3 |
| 9 | 2.9 |
| | Average 3.53 |

As indicated in Table B above, string-type cotton fiber reinforcement produced unexpectedly high tilt drop strength increases ranging between 2.9 and 4.2 times greater than the strength obtained from the body of conventional material having only asbestos fibers. Hence, the cotton fiber reinforced bodies of molded hydrous alkaline earth metal silicate are between 2.9 and 4.2 times less susceptible to damage resulting from accidental or careless dropping of the insulation material during shipment, handling and installation, and the like.

Although not absolutely necessary, it may be preferable to stiffen the cotton fibers somewhat in order to achieve the greatest reinforcing benefit and full advantage of the available fiber length. In this regard, and depending somewhat upon the character of the mixing apparatus, difficulty may be experienced in admixing unstiffened cotton fibers, string or twine, etc., into the slurry. Without adequate stiffness or rigidity, the slurry mixing operation may tend to cause excessive amounts of the fibers to ball, wad up or clump together. To prevent such happenings, therefore, the fibers, prior to being introduced into the slurry, may be impregnated with a stiffening agent capable of imparting sufficient rigidity or stiffness to the fibers to cause them to retain a generally virgate disposition even after being thoroughly admixed into the slurry. Numerous impregnants are available for stiffening the cotton fibers and most any are suitable provided the impregnant will not appreciably interfere with the crystallization of the slurry constituents and provided the impregnant will not appreciably dissolve until after the cotton fibers have been thoroughly admixed into the slurry. Similarly, the manner of impregnation of the fibers may be carried out according to conventional practices, such as by drawing the fibers under tension through a bath, pool, or spray, or the like, of liquid impregnating material. One preferable liquid impregnant is a 16 percent sodium silicate solution composed of 32.8 parts by weight of $Na_2O \cdot 3.25SiO_2$ in 172.2 parts by weight of water. In common practice, the stiffener would ordinarily be applied to a continuous filament, strand, string or procession of cotton fibers and impregnated fibers. Following impregnation of the cotton fibers, the sodium silicate solution is capable of being quickly hardened by subjecting the impregnated cotton fibers, while in a taut or stretched condition, to the drying influence of suitable low temperature heating or drying means. Thereafter, the fibers may be chopped or otherwise severed into fiber lengths of desired size. Other impregnating materials suitable for such purposes are various heat setting plastic resins, such as heat setting phenolic or epoxy coating resins. The various impregnants mentioned are, of course, merely representative of some among numerous materials which are available and suitable for accomplishing adequate stiffening of the cotton fibers.

In accordance with the form of the invention depicted in FIGS. 3 and 4, it will be observed that cotton fibers may also be advantageously employed in the form of a loose retiform mat or net of interlocking cotton fibers anchored in grid-like array within the molded body of hydrous alkaline earth metal silicate insulation material. The formation of a body of molded hydrous alkaline earth metal silicate insulation material reinforced in accordance with the last-mentioned concepts, as with the embodiment previously described, provides exceedingly high strength at low material cost.

Procedurally, the cotton net or mesh reinforced product of FIGS. 3 and 4 may be prepared by arranging a piece of cotton mesh fabric or netting which has been previously cut to the desired size and, if desired, contoured to the preferred configuration, in the desired oriented position, location and depth within the mold. Alternatively, the mold may either be filled before or after the placement of the net or mesh fabric, but ordinarily such placement is more convenient during or after the mold filling operation. Thereafter, the mold-contained slurry with the mesh reinforcement submerged in proper position therein is ready for induration and drying in the same manner as previously described with respect to Examples 1–9. In accordance with such procedure, a slurry having the composition set forth in Example 1 was prepared and poured into a series of identical cavity-type pan molds of a type well-known in the art and also shown in U.S. Pat. No. 2,716,070. Molds of this type are commonly utilized for the formation of a molded body of insulation material of the character shown in FIG. 1. In this particular instance, the mold was shaped to form a tubular segment having a wall thickness of approximately 1-½ inches and having an axially concentric arcuate internal wall surface shaped to snugly conform to and nest around a peripheral segment of a 12-inch diameter standard cast iron pipe. Thereafter, one each of several pieces of individually different commercially available cotton netting or mesh fabrics was submerged in the slurry of one each of the molds. To facilitate placement in the molds, the fabrics or netting were stiffened and shaped by saturating the same with a sodium silicate solution composed of 32.8 parts by weight of $Na_2O \cdot 3.25SiO_2$ in 172.2 parts by weight of water. The impregnated netting or fabric was then dried to a stiffened condition while shaped to correspond to the desired configuration. The cotton netting or mesh fabric was in each of the examples shaped to nest concentrically in the mold at a location spaced about one-half inch from the core. A core was then gently placed in position in each of the cavity molds to complete the mold assembly. Thereafter, all of the slurries were indurated and dried in accordance with the induration and drying procedures described in Example 1.

Each of the resultant molded bodies of material were, of course, identically shaped and differed only by virtue of the particular type of cotton netting or mesh fabric molded into the matrix of the insulation material. The identity, mesh designation of the fabric, fabric weight and further identity of the fabrics are specified in Table C following.

TABLE C

| Example number | Manufacturer's name and location | Product designation | Mesh size | Total weight, gm./yd.² | Weight of fill, gm./100 ft. | Weight of warp, gm. 100 ft. |
|---|---|---|---|---|---|---|
| 10 | Swift Mfg. Company, Columbus, Georgia | B3E | 3 x 3 | 48.8 | 9.58 | 10.61 |
| 11 | do | B2X | 3 x 3 | 51.0 | 6.84 | 7.48 |
| 12 | do | B2S | 3 x 3 | 61.38 | 6.62 | 16.42 |
| 13 | do | B2Y | 3 x 3 | 81.39 | 15.43 | 10.53 |
| 14 | do | .058 | 3 x 3 | 105.0 | 14.02 | 15.99 |
| 15 | Southern Mills, Inc., Atlanta, Georgia | Knit | 2 x 2 | 55.15 | 17.92 | 11.36 |
| 16 | do | Leno | 2 x 2 | 61.12 | 8.50 | 16.69 |
| 17 | Not determined | Fish net | | 98.6 | | |

For comparative purposes, Table D below sets forth the tilt drop strengths achieved for each of the above examples as compared on a relative strength basis with bodies of molded insulation material prepared and molded precisely according to the procedures followed for Examples 10–16, above, excepting that a cotton mesh fabric was not used.

TABLE D

| Example Number | Average Relative Strength |
|---|---|
| Std. Control without mesh fabric | 1 |
| 10 | 20 |
| 11 | 11 |
| 12 | 12 |
| 13 | 8 |
| 14 | 5 |
| 15 | 4 |
| 16 | 3 |
| 17 | 20 |
| Overall average relative strength | 10.38 |

Although the foregoing Examples 1–17 are specifically illustrative of molded hydrous calcium silicate products, it will be readily apparent that the characteristics of synthetically prepared hydrous calcium silicate formulations, in so far as they pertain to the present invention, are illustrative of the relative improved results which would be obtainable with other synthetically prepared alkaline earth metal types of crystalline hydrous silicate insulations materials. In this respect, molded bodies of synthetically prepared crystalline hydrous silicates of such other alkaline earth metals as barium, strontium, although ordinarily too expensive for commercial use, and magnesium, as well as calcium, or various combinations thereof are also benefited and strengthened by the inclusion of cotton fibers in the slurry in amounts ranging between 1 percent and 25 percent of the combined weight of fibers and finely divided solids content (dry weight basis) of the slurry. It is, however, preferred to employ the cotton fibers in amounts ranging between approximately 1 percent and 15 percent of the combined weight of fibers and finely divided solids content of the slurry. As used in the specification and ensuing claims, the term "finely divided" has reference to the particle size of the reactive slurry constituents and means a solid particle size sufficiently small to pass through a 200 mesh screen. The same relative percentages are also applicable to formulations in which it is desired to include other types of non-cotton fibers. However, in such instances, the entire fiber content should be less than 50 percent of the total weight of the resultant insulation material. Otherwise stated, the weight of cotton and non-cotton fibers together preferably should be less than the weight of the finely divided solid constituents of the slurry in order that a sufficient complement of reactive constituents will be present to provide adequate structural integrity to the matrix of the resultant body of molded insulation material.

Example 2 exhibits the wide applicability of the present invention and sets forth a preferred broad range of proportions (dry weight basis) of formulations within the basic concepts of this invention.

EXAMPLE 2

| | |
|---|---|
| Finely divided alkaline earth metal oxide (selected from oxides of calcium, magnesium, barium and strontium) | 15–35 |
| Finely divided silicon dioxide | 20–40 |
| Cotton reinforcing fibers | 1–25 |
| Other reinforcing fibers (preferably asbestos) | 0–29 |
| Total of cotton and other reinforcing fibers | 1–40 |
| Other finely divided inorganic additives and fillers | 0–35 |
| Total | 100% |

The formulations of Example 2 may be dispersed in water to form a slurry having a water to total solids weight ratio ranging from approximately 0.75:1 to 15:1, depending upon the density desired in the final insulation product and depending upon the type of processing to which the slurry is to be subjected. For example, in a pan-casting procedure such as discussed with respect to Example 1, a water to total solids weight ratio not in excess of approximately 10:1 is preferred. Accordingly, variation in the water to total solids weight ratio of from 0.75:1 to 10:1 will in a pan-casting process permit an attendant variation in density of the final product ranging between about 45 p.c.f. to 5 p.c.f., respectively. On the other hand, in processes in which the slurry is pre-reacted, diluted and subjected to pressure filtration operations as in U.S. Pat. No. 2,699,097, a water to total solids weight ratio in the range from 10:1 to about 15:1 would be preferred.

Following either conventional pan-casting or pressure filtration molding and indurating procedures, the inclusion of cotton fibers in the slurry in such amount as to constitute from 1 – 25 percent of the total solids in the slurry serves to reinforce and greatly enhance the structural strength of the ultimate molded product. While it is not intended to limit the scope of the present invention by the indication of preference with respect to the length of the cotton fibers, it is preferred that the cotton fibers should be at least one-half inch or more in length. It is also similarly preferred that the fibers should nor ordinarily exceed approximately 2 inches in length, especially where substantial mixing operations are necessitated subsequent to inclusion of the cotton fibers in the slurry.

From the foregoing, it will be readily apparent that the present invention provides for the formation of cotton fiber reinforced bodies of syntheticaly prepared hydrous alkaline earth metal silicate insulation materials and that such bodies of insulation material possess unexpectedly high strengths, as well as other improved and highly beneficial characteristics. Moreover, it will, of course, be understood that many various details in the description of the present invention are illustrative only, and are capable of being modified extensively without departing from the scope and intendment of the invention. Accordingly, it is not the purpose to limit the scope of the patent granted hereon otherwise than as necessitated by the scope of the appended claims.

I claim:

1. An aqueous slurry for forming a fiber reinforced body of molded synthetic hydrous alkaline earth metal silicate insulation material and comprising:

a. finely divided constituents suspended in said slurry said finely divided constituents being predominantly comprised of hydrothermally interreactive proportions of alkaline earth metal oxide and silicon dioxide constituents, and b. cotton fibers having a length at least about one-half inch and in an amount from 1 percent to 25 percent by weight of said finely divided solids, said fibers being in the form of spaced apart twisted string-type strands which are generally uniformly distributed throughout said slurry.

2. An aqueous slurry as defined in claim 1, wherein said string-type strands of cotton fibers are present in said slurry in the form of randomly dispersed lengths of multiple ply cotton string.

3. An aqueous slurry as defined in claim 1, wherein said multiple ply cotton string is characterized by having a weight to length ratio of from about 7 to 29 grams per 100 feet.

4. An aqueous slurry as defined in claim 1, wherein said string-type strands of cotton fibers are not in excess of 15 percent by weight of said finely divided solids.

5. An aqueous slurry as defined in claim 1, wherein said string-type strands of cotton fibers are impregnated with an adjunct fiber stiffening material.

6. An aqueous slurry as defined in claim 5, wherein said cotton fiber stiffening material is composed of sodium silicate.

7. An aqueous slurry as defined in claim 5, wherein said cotton fiber stiffening material is the dry residue of a solution composed of approximately 32.8 parts by weight of $Na_2O \cdot 3.25SiO_2$ is approximately 172.2 parts by weight of water.

8. An aqueous slurry as defined in claim 5, wherein said cotton fiber stiffening material is a heat set organic plastic resin.

9. An aqueous slurry as defined in claim 5, wherein said cotton fiber stiffening material is a heat set epoxy coating resin.

10. An aqueous slurry as defined in claim 5, wherein said cotton fiber stiffening material is a phenolic resin.

11. In the process of forming an aqueous slurry preparatory to transformation of said slurry into a self-supporting body of hydrous alkaline earth metal silicate insulation material comprising preparing an aqueous slurry consisting essentially of water, reinforcing fibers and hydrothermally reactive proportions of finely divided alkaline earth metal silicate insulation forming constituents, the improvement comprising: mixing cotton fibers having a length of more than about one-half inch into said aqueous slurry in an amount from 1 percent to 25 percent of the combined weight of fibers and finely divided insulation forming constituents, said fibers being spaced apart or unconnected strands of more than about one-half inch in length to give uniform reinforcement throughout the slurry in the form of spaced apart twisted strands.

12. The improvement in the process according to claim 11, wherein at least a portion of said twisted strands of cotton fibers are included in said aqueous slurry in the form of an interconnected open-mesh network of cotton fibers.

13. The improvement in the process according to claim 11, wherein essentially all of said twisted strands of cotton fibers range from at least one-half to two inches in length.

14. The process of claim 11 wherein said strands are unconnected and are impregnated with an adjunct fiber stiffening material.

15. The process of claim 14 wherein said adjunct fiber stiffening material is the dry residue of a liquid sodium silicate.

* * * * *